US007866367B2

(12) United States Patent
Liang et al.

(10) Patent No.: US 7,866,367 B2
(45) Date of Patent: Jan. 11, 2011

(54) CONTROL DEVICE FOR SLAT BLINDS

(75) Inventors: Wen Ying Liang, Changhua County (TW); Sheng Ying Hsu, Changhua County (TW); Wu Chung Nien, Changhua County (TW); Chien Chih Huang, Changhua County (TW)

(73) Assignee: Ching Feng Home Fashions Co., Ltd, Changhua County (TW)

( * ) Notice: Subject to any disclaimer, the term of this patent is extended or adjusted under 35 U.S.C. 154(b) by 111 days.

(21) Appl. No.: 12/219,969

(22) Filed: Jul. 31, 2008

(65) Prior Publication Data

US 2010/0006236 A1 Jan. 14, 2010

(30) Foreign Application Priority Data

Jul. 11, 2008 (TW) .............................. 97126389 A

(51) Int. Cl.
*E06B 9/305* (2006.01)
*E06B 9/26* (2006.01)
*E06B 9/30* (2006.01)
*F16H 35/06* (2006.01)
*F03G 1/00* (2006.01)

(52) U.S. Cl. ................ 160/173 R; 160/170; 160/84.04; 74/397; 185/39

(58) Field of Classification Search ................. 160/170, 160/171, 84.04, 168.1 R, 176.1 R, 177 R, 160/178.1 R; 74/406, 395, 396, 397
See application file for complete search history.

(56) References Cited

U.S. PATENT DOCUMENTS

| | | | | |
|---|---|---|---|---|
| 1,267,423 | A * | 5/1918 | Kunkle | 185/37 |
| 2,498,079 | A * | 2/1950 | Hunter | 160/177 R |
| 4,478,313 | A * | 10/1984 | Wakase | 185/39 |
| 4,648,487 | A * | 3/1987 | Kimura | 185/39 |
| 4,651,794 | A * | 3/1987 | Bytheway, Jr. | 160/168.1 R |
| 4,697,630 | A * | 10/1987 | Rude | 160/177 R |
| 5,188,198 | A * | 2/1993 | Muramatsu et al. | 185/39 |
| 5,267,598 | A * | 12/1993 | Marocco | 160/177 R |
| 5,638,882 | A * | 6/1997 | Morris | 160/176.1 R |
| 5,638,922 | A * | 6/1997 | Morikawa | 185/39 |
| 6,536,503 | B1 * | 3/2003 | Anderson et al. | 160/170 |
| 6,588,480 | B2 * | 7/2003 | Anderson | 160/170 |
| 6,968,884 | B2 * | 11/2005 | Anderson et al. | 160/170 |
| 7,311,133 | B2 * | 12/2007 | Anderson et al. | 160/170 |
| 2002/0050539 | A1 * | 5/2002 | Anderson | 242/170 |
| 2002/0174961 | A1 * | 11/2002 | Anderson et al. | 160/178.1 R |
| 2004/0144500 | A1 * | 7/2004 | Nien | 160/170 |
| 2006/0000561 | A1 * | 1/2006 | Anderson et al. | 160/168.1 R |
| 2006/0118248 | A1 * | 6/2006 | Anderson et al. | 160/84.04 |
| 2007/0261797 | A1 * | 11/2007 | Fraser et al. | 160/168.1 R |

(Continued)

*Primary Examiner*—Katherine Mitchell
*Assistant Examiner*—Jaime F Cardenas-Garcia

(57) ABSTRACT

A control device for blinds includes a transmission unit, a scrolling unit and a tilting unit, the transmission unit includes a case in which a coil spring and a gear unit are received. The coil spring is connected between the gear unit and the case. The scrolling unit includes two scrolling rods which are rotated with a transmission rod. Each scrolling rod has a lift cord wrapped thereon and extending through slats of the blinds. The tilting unit includes two tilt members connected to two respective end sections of the two scrolling rods. Two tilt cords have two respective positioning members which are clamped in two clamp grooves of the two tilt members and the tilt cords extend through the slats. The gears in the gear unit can be adjusted so as to cooperate with slats of different weights.

5 Claims, 11 Drawing Sheets

U.S. PATENT DOCUMENTS

2007/0261798 A1 * 11/2007 Hung et al. ................. 160/170
2008/0087386 A1 * 4/2008 Nien et al. .................. 160/170
2008/0093034 A1 * 4/2008 Anderson et al. ........... 160/170
2008/0210387 A1 * 9/2008 Yang .................... 160/168.1 V

* cited by examiner

CONTROL DEVICE FOR SLAT BLINDS

FIELD OF THE INVENTION

The present invention relates to a control device for slat blinds, and more particularly, to a lifting mechanism and a tilting mechanism for slat blinds.

BACKGROUND OF THE INVENTION

The slats of blinds can be adjusted by a conventional control device composed of a lifting mechanism and a tilting mechanism. The conventional lifting mechanism 8 of a slat blinds is shown in FIGS. 11 and 12, and generally includes an end cord 81 which has a curved end 811 and a cord wheel 82 on which a lift cord 83 is wrapped. The lift cord 83 includes a loop 831 formed on an end thereof so as to be tied with the curved end 811 of the end cord 81. A first wheel 84 is synchronically rotated with the cord wheel 82 and a coil spring 86 is connected between the first wheel 84 and a second wheel 85. The coil spring 86 is an S-shaped spring and one end of the coil spring 86 forms a coil 861 which provides a torque the same as the weight of the slats 9 so as to position the slats 9 at desired height. When the user pulls the transverse bar at the lower end of the blinds, the cord wheel 82 release or pulls the lift cord 83 and the coil spring 86 keeps the slats 9 at desired position.

The cord wheel 82 and the first wheel 84 are synchronically rotated by using a gear set and the cord wheel 82 is controlled by the coil spring 86. Because the lift cord 83 includes the loop 831 which is tied with the curved end 811 of the end cord 81, so that the lift cord 83 is easily broken after frequent pull and drag. Besides, because the weights of the blinds of different sizes are different so that the cord wheel 82 and the first wheel 84 should be adjustable to meet different sizes of the blinds. Unfortunately, the conventional lifting and tilting mechanisms do not have such function.

The present invention intends to provide a-control device which is cooperated with a gear set to control the slats of the blinds, the gear sizes of the gear set can be adjusted so as to operate slats of different weights.

SUMMARY OF THE INVENTION

The present invention relates to a control device for blinds and the control device includes a transmission unit, a scrolling unit and a tilting unit, all of the three units are received in a box of the blinds. The transmission unit has a case, a coil spring and a gear unit which is connected between the gear unit and the case. The scrolling unit includes two scrolling rods and a transmission rod. Each scrolling rod has a lift cord wrapped thereon which extends through slats of the blinds. The transmission rod securely extends through the gear unit so as to rotate with the two scrolling rods. The tilting unit includes two tilt members connected to two respective end sections of the two scrolling rods. Two tilt cords have two respective positioning members which are clamped in two clamp grooves of the two tilt members and the tilt cords extend through the slats. The gears in the gear unit can be adjusted so as to cooperate with slats of different weights.

The primary object of the present invention is to provide a control device for blinds wherein the gears in the gear unit can be adjusted so as to cooperate with slats of different weights.

Another object of the present invention is to provide a control device for blinds wherein two tilt members are connected to the two scrolling rods and two tilt cords have two respective positioning members which are clamped in two clamp grooves of the two tilt members. The tilt cords extend through the slats so as to tilt the slats.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
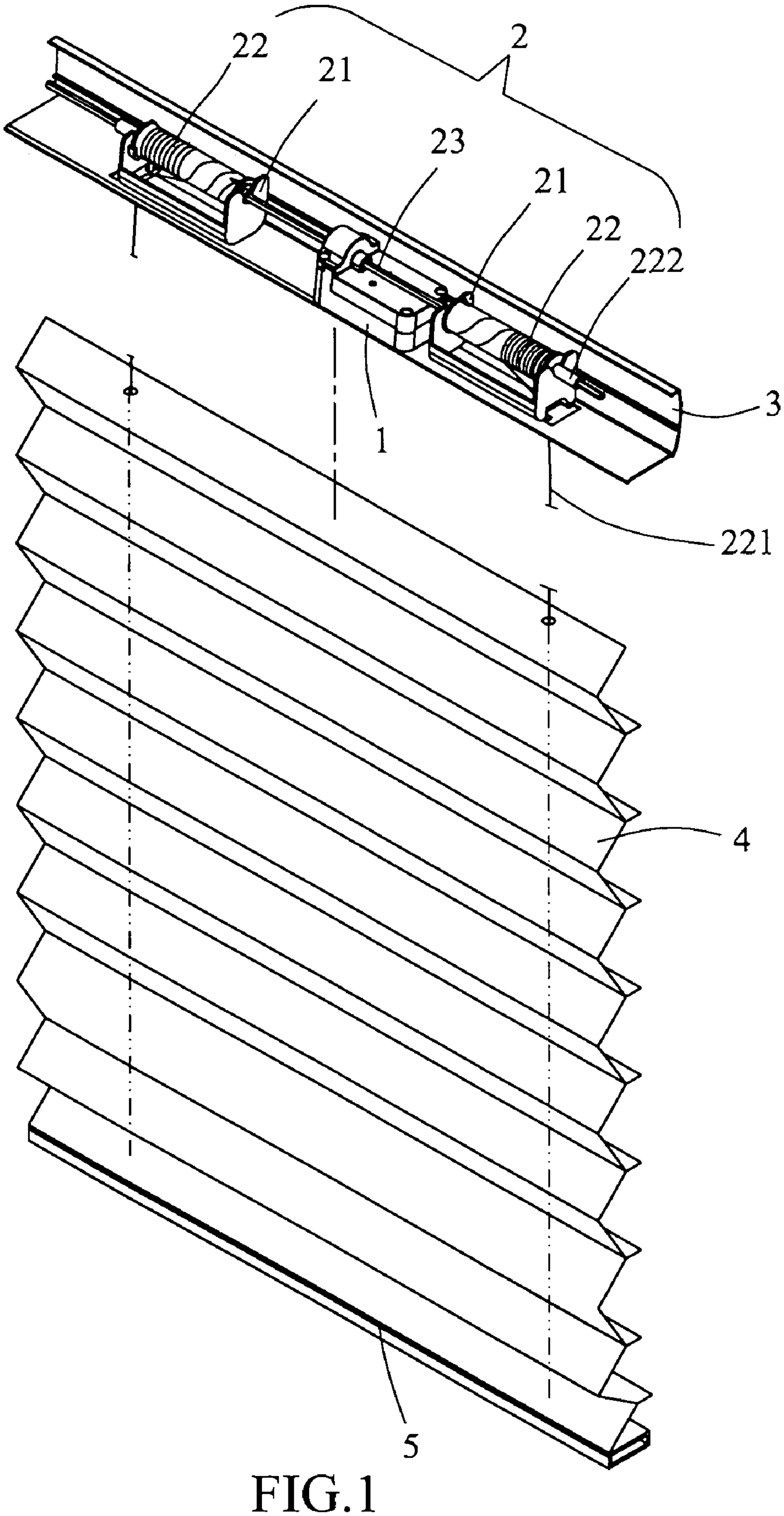
FIG. 1 shows the control device of the present invention and a binds.
Figure 2:
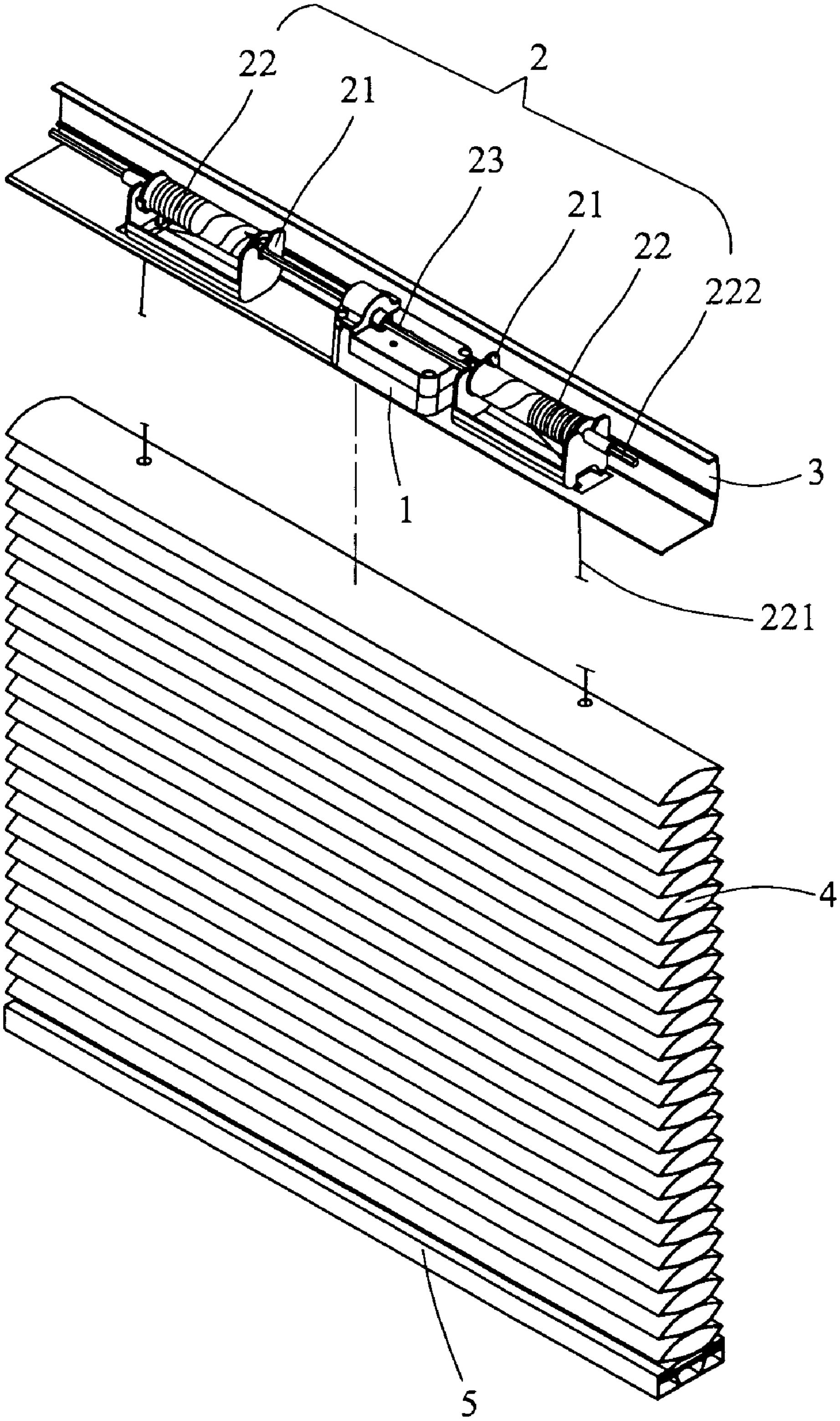
FIG. 2 shows the control device of the present invention and another type of binds.
Figure 3:
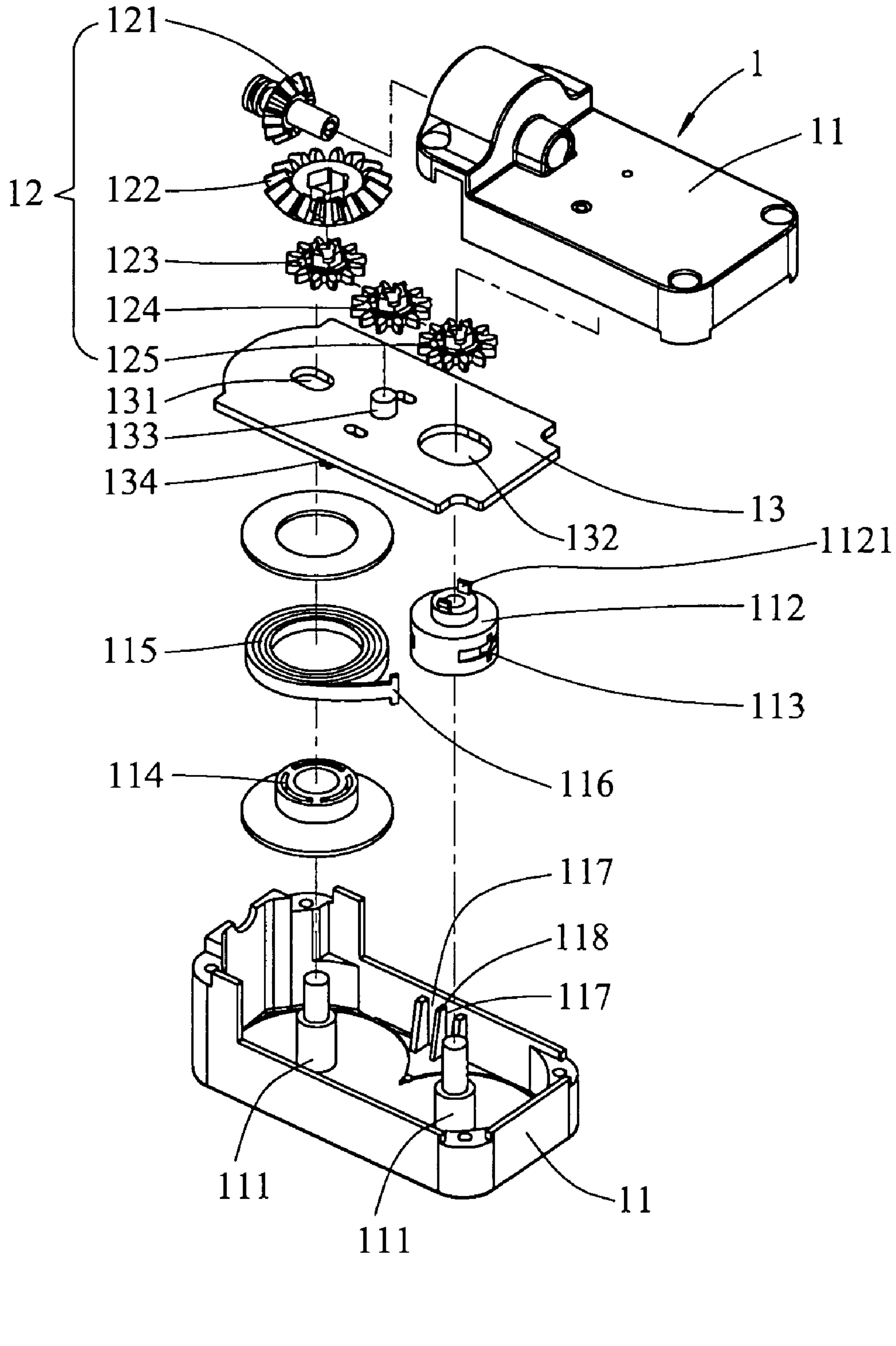
FIG. 3 is an exploded view to show the control device of the present invention.
Figure 4:
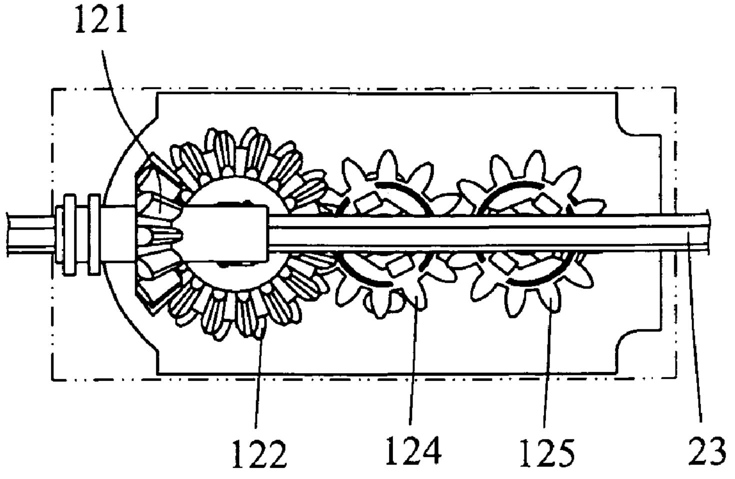
FIG. 4 is a top view to show the connection of the gears of the gear unit and transmission rod of the control device of the present invention.
Figure 5:
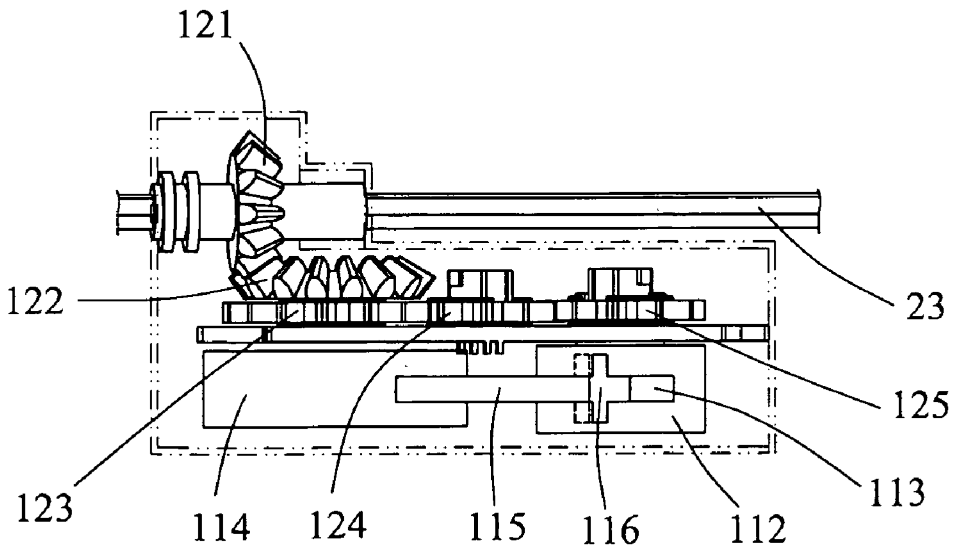
FIG. 5 is a side view to show the connection of the gears of the gear unit and transmission rod of the control device of the present invention.

Referring to FIGS. 1 to 5, the control device for blinds of the present invention comprises a transmission unit 1, a scrolling unit 2 and a tilting unit, wherein the transmission unit 1, the scrolling unit 2 and the tilting unit are received in a box 3 located on a top of the blinds. The blinds include slats 4 connected by the lift cord 221 and the tilt cord 7, and a transverse bar 5 is connected to the lowest slat 4.

The transmission unit 1 includes a case 11, a coil spring 115 and a gear unit 12, wherein the coil spring 115 has a first end connected to the gear unit 12 and a second end of the coil spring 115 fixed within the case 11 so as to provide a force to keep the slats 4 at a desired height. The case 11 includes two posts 111 extending from an inner end thereof and two engaging recesses 117 are defined in an inside of each of two sidewalls thereof. A positioning plate 118 is located between the two engaging recess 117. A separation board 13 is located in the case 11 so as to define an upper space and a bottom space in the case 11. The separation board 13 includes a first slot 131 and a second slot 132 defined therethrough, in this embodiment, the first and second slots 131, 132 are elongate slots. The separation board 13 includes two insertions 134 extending from two sides of an underside thereof, the insertions 134 are removably inserted in the engaging recesses 117 of the case 11 and contact against the positioning plates 118. The two posts 111 extend through the first and second slots 131, 132. A protrusion 133 extends from a top of the separation board 13.

The gear unit 12 includes a first bevel gear 121, a second bevel gear 122, a first spur gear 123, a second spur gear 124 and a third spur gear 125. The transmission rod 23 of the scrolling unit 2 extends through the first bevel gear 121 which is engaged with the second bevel gear 122, the second bevel gear 122 is co-axially connected with the first spur gear 123, the first and third spur gears 123, 125 are mounted to the two posts 111 of the case 11 respectively. The second spur gear 124 is mounted on the protrusion 133 and engaged with first and third spur gears 123, 125. It is note that gear unit 12 and the transmission rod 23 are located in the upper space in the box 11, the first spur gear 123 is located above the first slot 131 and the third spur gear 125 is located above the second slot 132.

A rotary member 112 is mounted to one of the two posts 111 and the third spur gear 125 is engaged with the rotary member 112. The rotary member 112 is located beneath the separation board 13. A rotary wheel 114 is mounted to the other post 111 and the coil spring 115 is mounted to the rotary wheel 114. The rotary member 112 includes a notch 113 and the second end of the coil spring 115 has an engaging end 116 which is engaged with the notch 113.

The scrolling unit 2 includes two frames 21 and two scrolling rods 22 and the transmission rod 23 are located in the frames 21. Each scrolling rod 22 has a lift cord 221 wrapped thereon which extends through the slats 4 of the blinds. The transmission rod 23 securely extends through the gear unit 12 so as to rotate with the two scrolling rods 22.

When operating the transverse bar 5, the slats 4 can be lifted or lowered by the lift cords 221 to rotate the scrolling rods 22, the scrolling rods 22 rotates the transmission rod 23. The first bevel 121 is rotated which drives the second bevel gear 122, the first spur gear 123, the second spur gear 124 and the third spur gear 125. The coil spring 115 beneath the separation board 13 drives the rotary member 112 such that the slats 4 can be kept at a desired height by the force from the coil spring 115 and the gear unit 12.

Figure 6A:
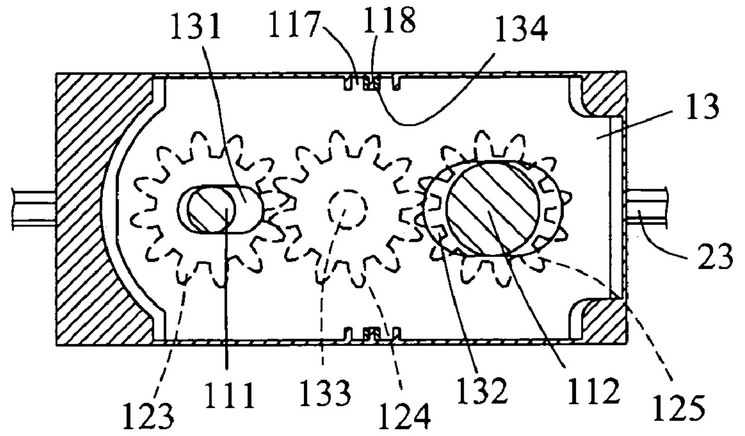
FIGS. 6A to 6C show the adjustment of the positions of the gears of the gear unit.
Figure 6B:
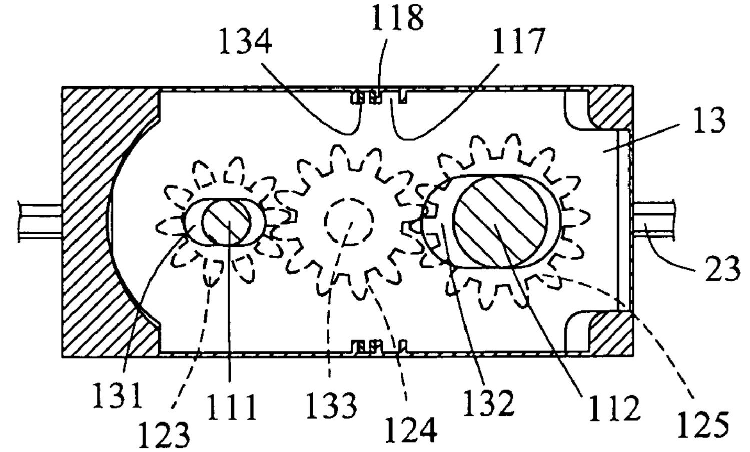
Figure 6C:
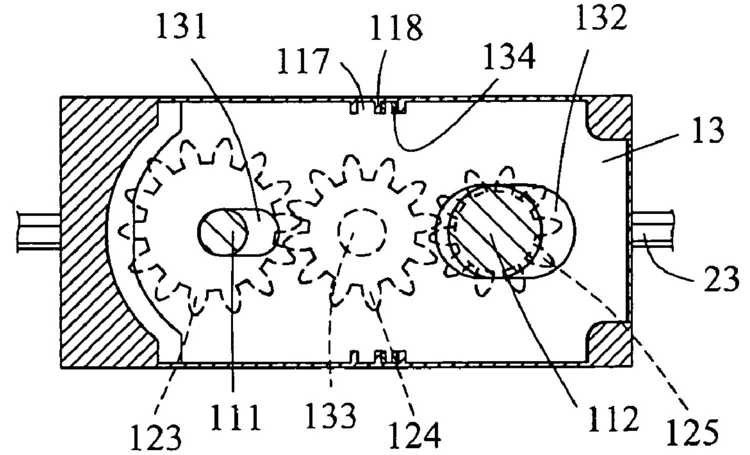

As shown in FIGS. 6A to 6C, the separation board 13 can be adjusted by inserting the insertions 134 into different engaging recesses 117, the sizes of the gears can be changed to meet different requirements of the weights of the slats 4.

Figure 7:
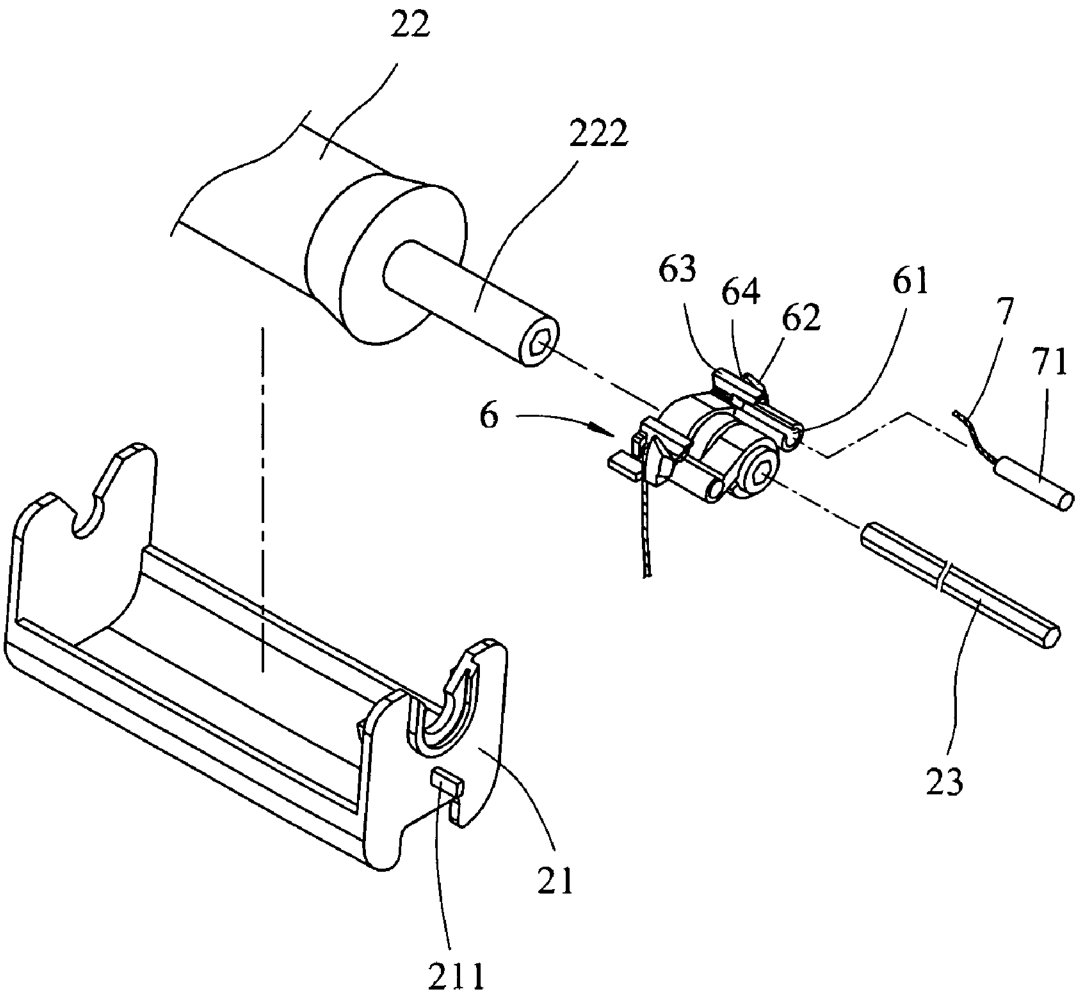
FIG. 7 is an exploded view to show the tilting unit of the control device of the present invention.
Figure 8:
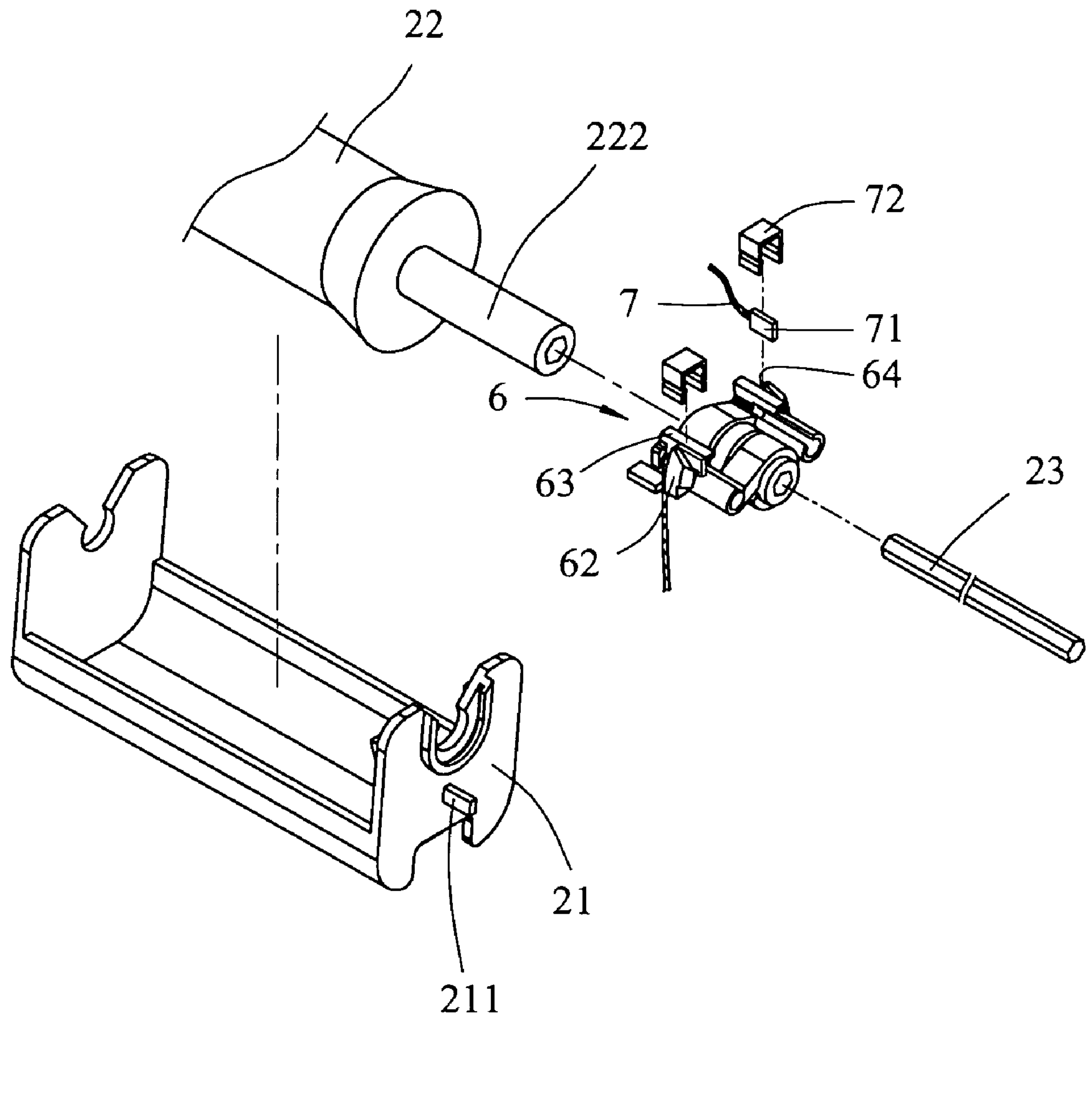
FIG. 8 is an exploded view to show another embodiment of the tilting unit of the control device of the present invention.
Figure 9A:
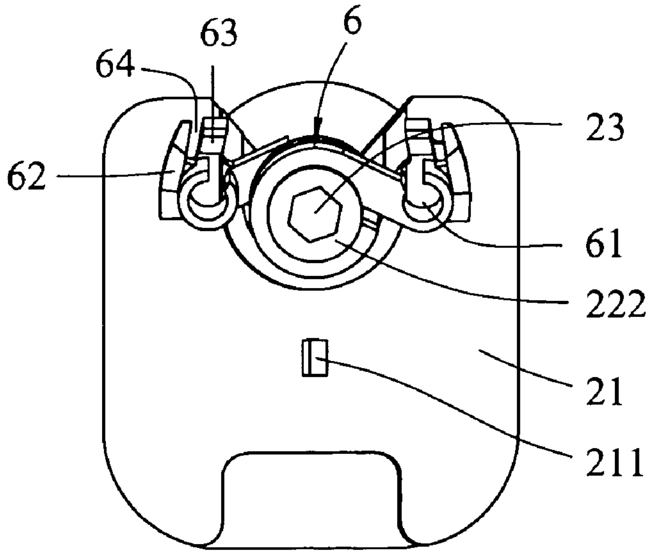
FIGS. 9A and 9B show that the tilt member is stopped by the stop on the frame.
Figure 9B:
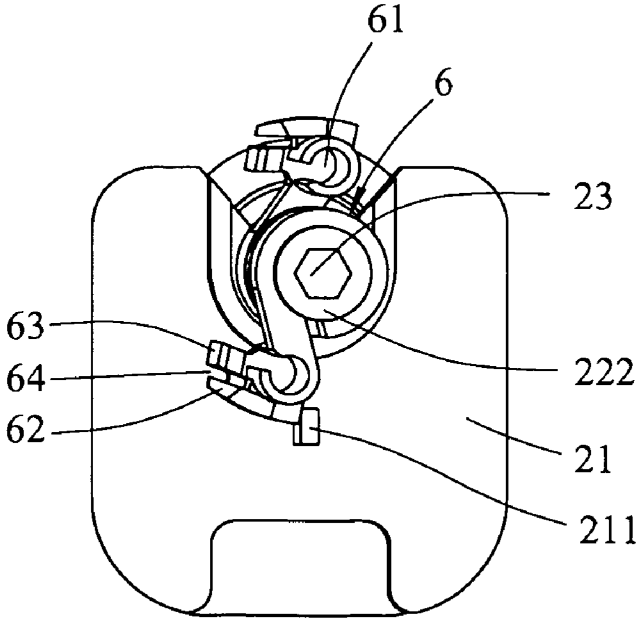
Figure 10:
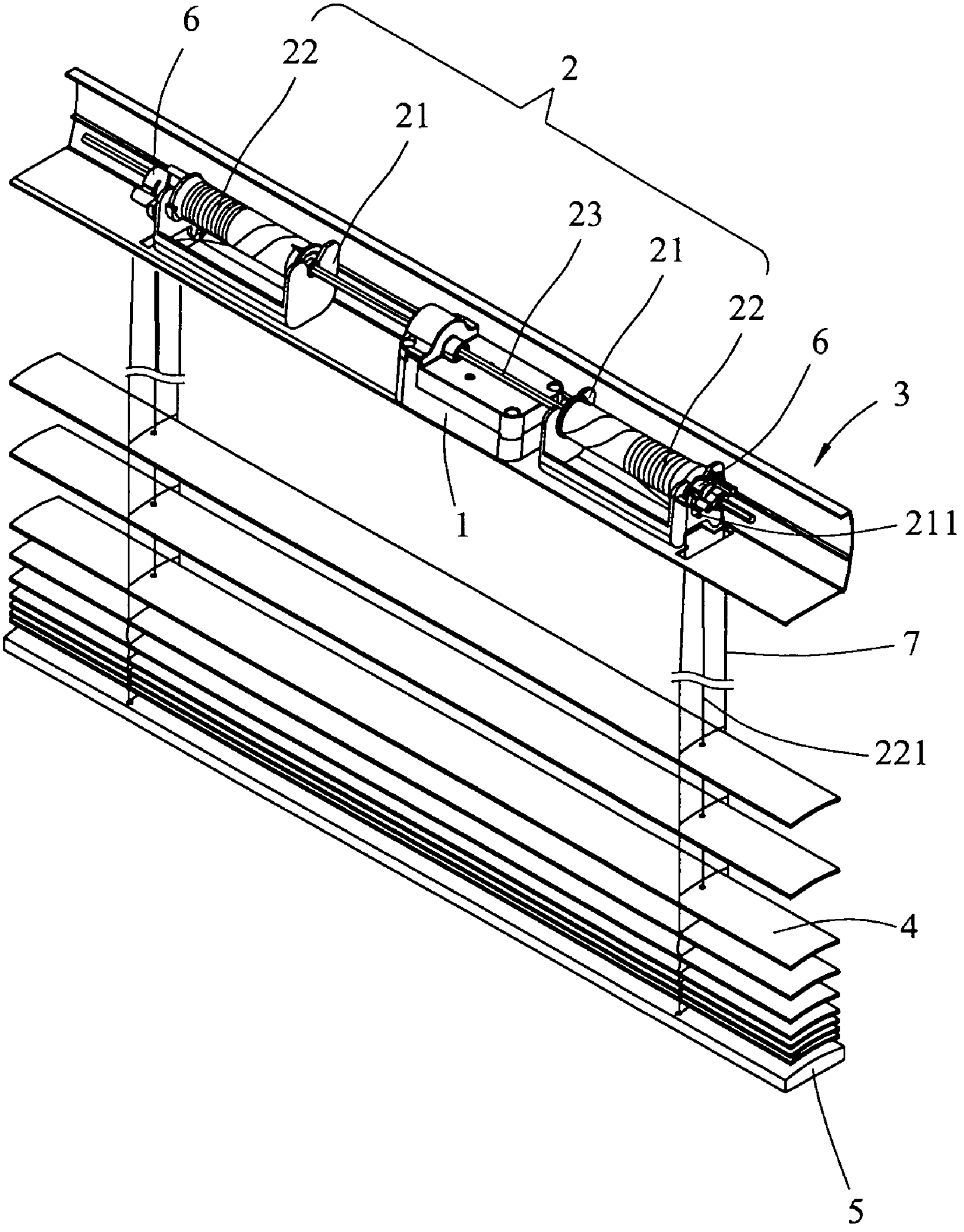
FIG. 10 shows the control device of the present invention and yet another binds.
Figure 11:
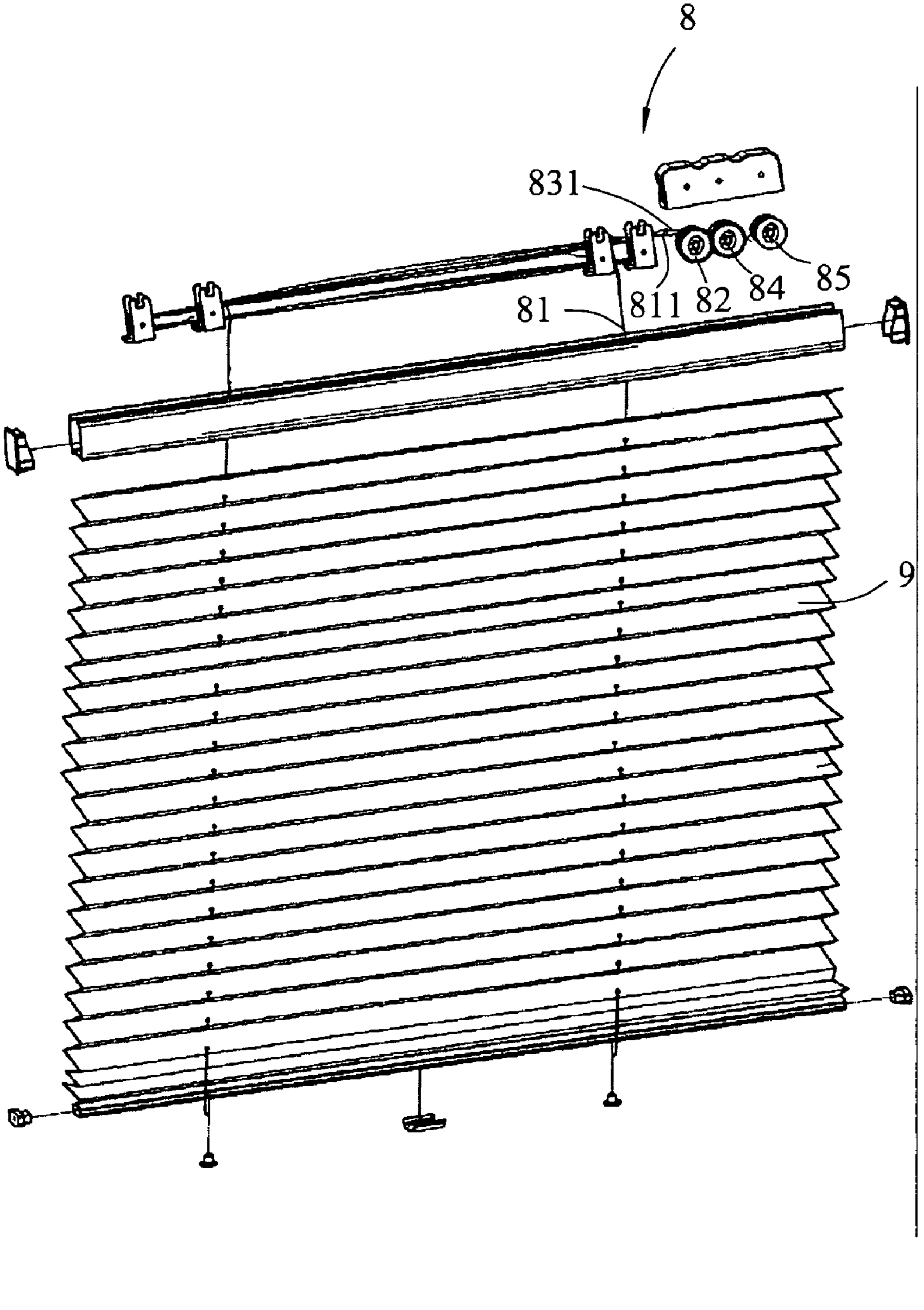
FIG.11 PRIOR ART
FIG. 11 is an exploded view to show the conventional control device and a blinds.
Figure 12:
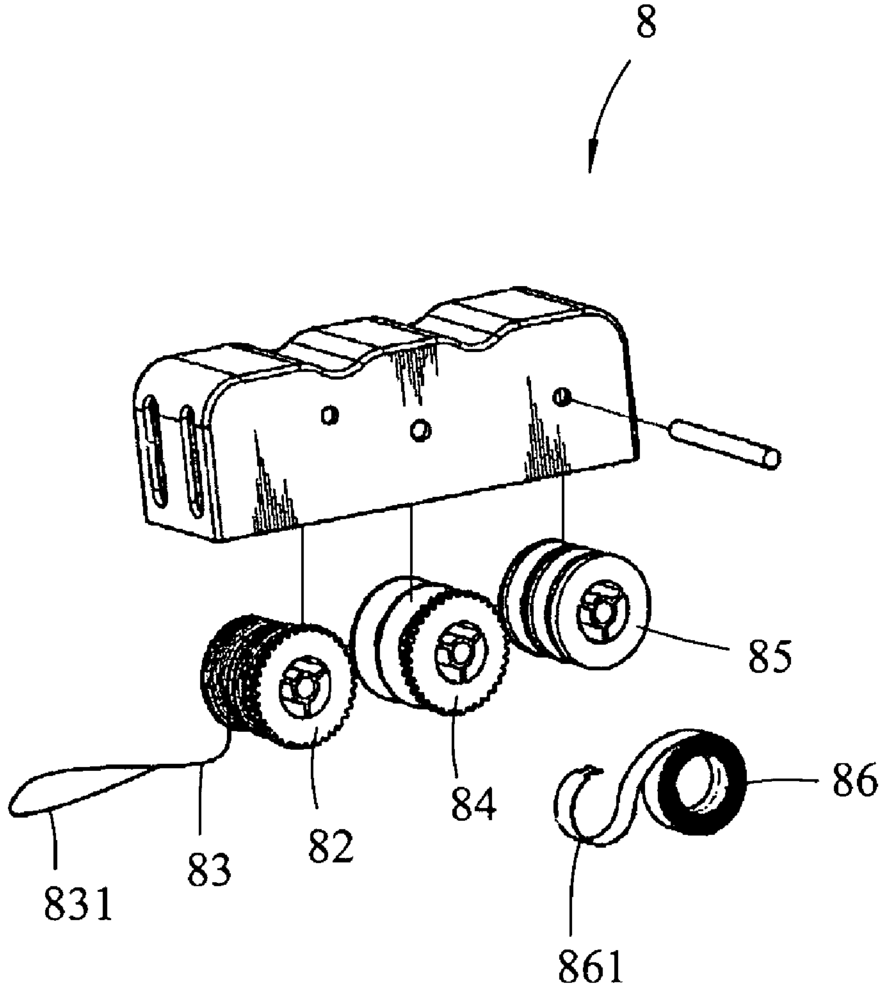
FIG.12 PRIOR ART
FIG. 12 shows the parts of the conventional control device.

As shown in FIGS. 7, 8 and 10, each of the two scrolling rods 22 includes an end section 222 and two tilt members 6 of the tilting unit are connected to the two respective end sections 222 of the two scrolling rods 22. Each of the two tilt members 6 includes two clamp grooves 61 on two sides thereof. The two tilt cords 7 each have a positioning member 71 which is clamped in the clamp groove 61 corresponding thereto. The tilt cords 7 extend through the slats 4. The clamp grooves 61 each are a cylindrical groove and each of the two positioning members 71 is a cylindrical member which is sized to be force-fitted into the clamp grooves 61. Each of the frames 21 includes a stop 211 on an end thereof, each of the tilt members 6 includes two side plates 62. Two protruding plates 63 and two slits 64. The two slits are defined between the side plates 62 and the two protruding plates 63. The side plate 62 is located on a side of the slit 64 and the protruding plate 63 is located above the slit 64. As shown in FIGS. 9A and 9B, when operating the tilting unit, the transmission rod 23 drives the end sections 222 and the tilt members 6 rotate to change the tilt angle of the slats 4. The tilt members 6 can be stopped when the side plate 62 is stopped by the stop 211.

As shown in FIG. 8 which shows another embodiment of the tilt unit, wherein each of the tilt cords 7 includes a clip 72 and the positioning member 71 is received in the slit 64. The clip 72 clamps the side plate 62 and the protruding plate 63.

While we have shown and described the embodiment in accordance with the present invention, it should be clear to those skilled in the art that further embodiments may be made without departing from the scope of the present invention.

What is claimed is:

1. A control device for blinds, comprising:

a transmission unit adapted to be received in a box of the blinds and having a case, a coil spring and a gear unit, the coil spring having a first end connected to the gear unit and a second end of the coil spring fixed within the case;

a scrolling unit adapted to be received in the box of the blinds and having two scrolling rods and a transmission rod, each scrolling rod having a lift cord wrapped thereon which is adapted to extend through slats of the blinds, the transmission rod securely extending through the gear unit so as to rotate with the two scrolling rods;

the case includes two posts extending therefrom, the gear unit including a first bevel gear, a second bevel gear, a first spur gear, a second spur gear and a third spur gear, the transmission rod extending through the first bevel gear which is engaged with the second bevel gear, the second bevel gear being co-axially connected with the first spur gear, the first and third spur gears mounted to the posts of the case, respectively;

the case including a separation board located therein and the separation board including a first slot and a second slot defined therethrough, the first and second slots being elongate slots, the two posts extending through the first and second slots, a protrusion extends from a top of the separation board and the second spur gear mounted on the protrusion, the first spur gear located above the first slot and the third spur gear located above the second slot, and the separation board including two insertions extending from two sides of an underside thereof, the case including two engaging recesses defined in an inside of each of two sidewalls thereof, a positioning plate located between the two engaging recesses, the insertions adjustably inserted in the engaging recesses of the case and contact against the positioning plate so as to adjust the position of the separation board relative to the two posts.

2. The device as claimed in claim 1, wherein a rotary member is mounted to one of the two poets and the third spur gear is engaged with the rotary member, the second end of the coil spring is fixed to the rotary member.

3. The device as claimed in claim 2, wherein the rotary member includes a notch and the second end of the coil spring has an engaging end which is engaged with the notch.

4. The device as claimed in claim 2, wherein a rotary wheel is mounted to the other post and the coil spring is mounted to the rotary wheel.

5. The device as claimed in claim 1, wherein the scrolling unit includes two frames which are adapted to be located in the box and the scrolling rods and the transmission rod are located in the frames.

* * * * *